Oct. 11, 1949.　　　　　R. W. MAY　　　　　2,484,638
SELECTIVE CONTROL DEVICE FOR RADIO
APPARATUS AND THE LIKE
Filed May 14, 1947　　　　　　　　　　　12 Sheets-Sheet 1

RICHARD W. MAY
INVENTOR
BY John J. Rogan
ATTORNEY

Oct. 11, 1949.

R. W. MAY 2,484,638

SELECTIVE CONTROL DEVICE FOR RADIO
APPARATUS AND THE LIKE

Filed May 14, 1947

RICHARD W. MAY
INVENTOR

BY John J. Rogan
ATTORNEY

Oct. 11, 1949.    R. W. MAY    2,484,638
SELECTIVE CONTROL DEVICE FOR RADIO
APPARATUS AND THE LIKE

Filed May 14, 1947    12 Sheets-Sheet 3

RICHARD W. MAY
INVENTOR

BY John J. Logan
ATTORNEY

RICHARD W. MAY
INVENTOR
BY John J. Rogan
ATTORNEY

Oct. 11, 1949.                R. W. MAY                2,484,638
                 SELECTIVE CONTROL DEVICE FOR RADIO
                       APPARATUS AND THE LIKE
Filed May 14, 1947                                 12 Sheets-Sheet 7

RICHARD W. MAY
INVENTOR
BY John J. Logan
ATTORNEY

Oct. 11, 1949.

R. W. MAY 2,484,638

SELECTIVE CONTROL DEVICE FOR RADIO
APPARATUS AND THE LIKE

Filed May 14, 1947

RICHARD W. MAY
INVENTOR

BY John J. Rogan
ATTORNEY

Oct. 11, 1949.  R. W. MAY  2,484,638
SELECTIVE CONTROL DEVICE FOR RADIO
APPARATUS AND THE LIKE
Filed May 14, 1947  12 Sheets-Sheet 10

SETTING-UP

FINAL SELECTED
And
LOCKED POSITION

HOME POSITION

RICHARD W. MAY
INVENTOR

BY John J. Rogan
ATTORNEY

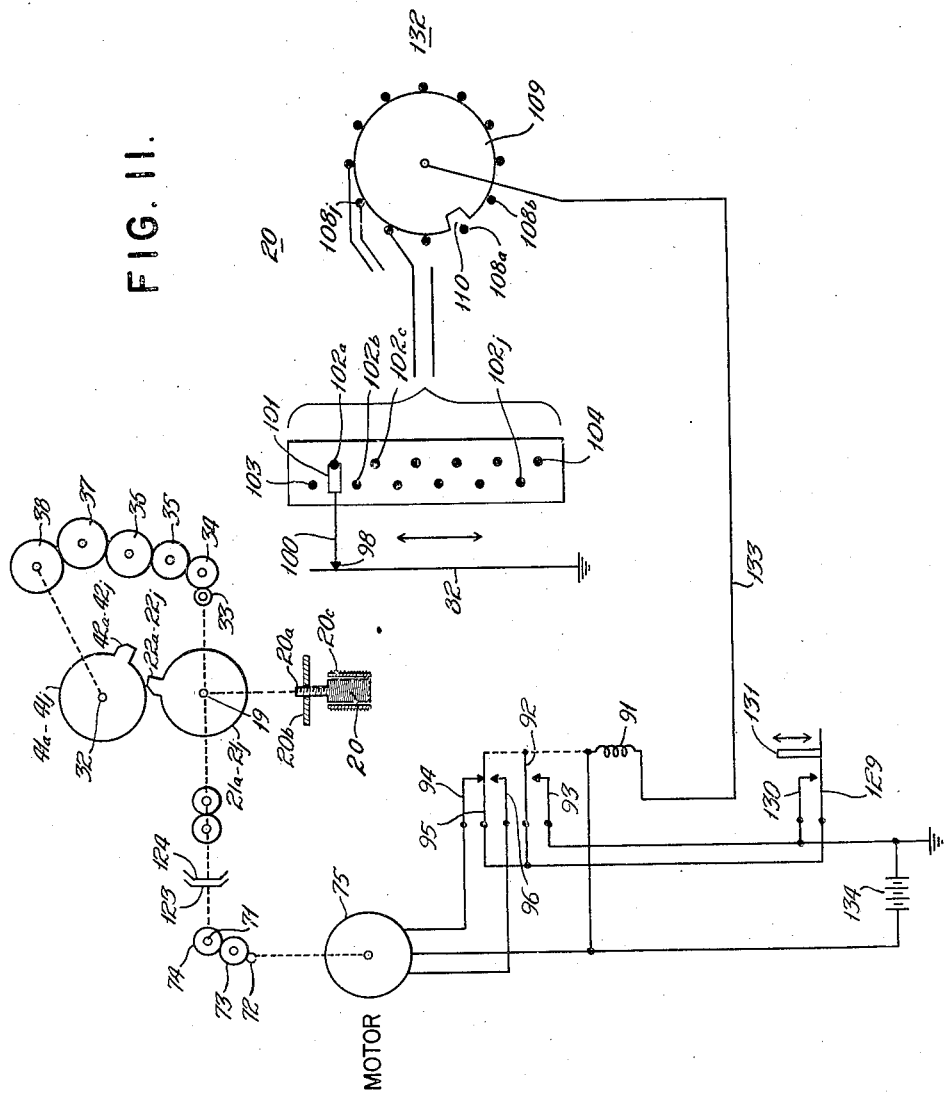

Oct. 11, 1949.　　　　　　　R. W. MAY　　　　　　2,484,638
　　　　　　　SELECTIVE CONTROL DEVICE FOR RADIO
　　　　　　　　　　　APPARATUS AND THE LIKE
Filed May 14, 1947　　　　　　　　　　　　12 Sheets-Sheet 12
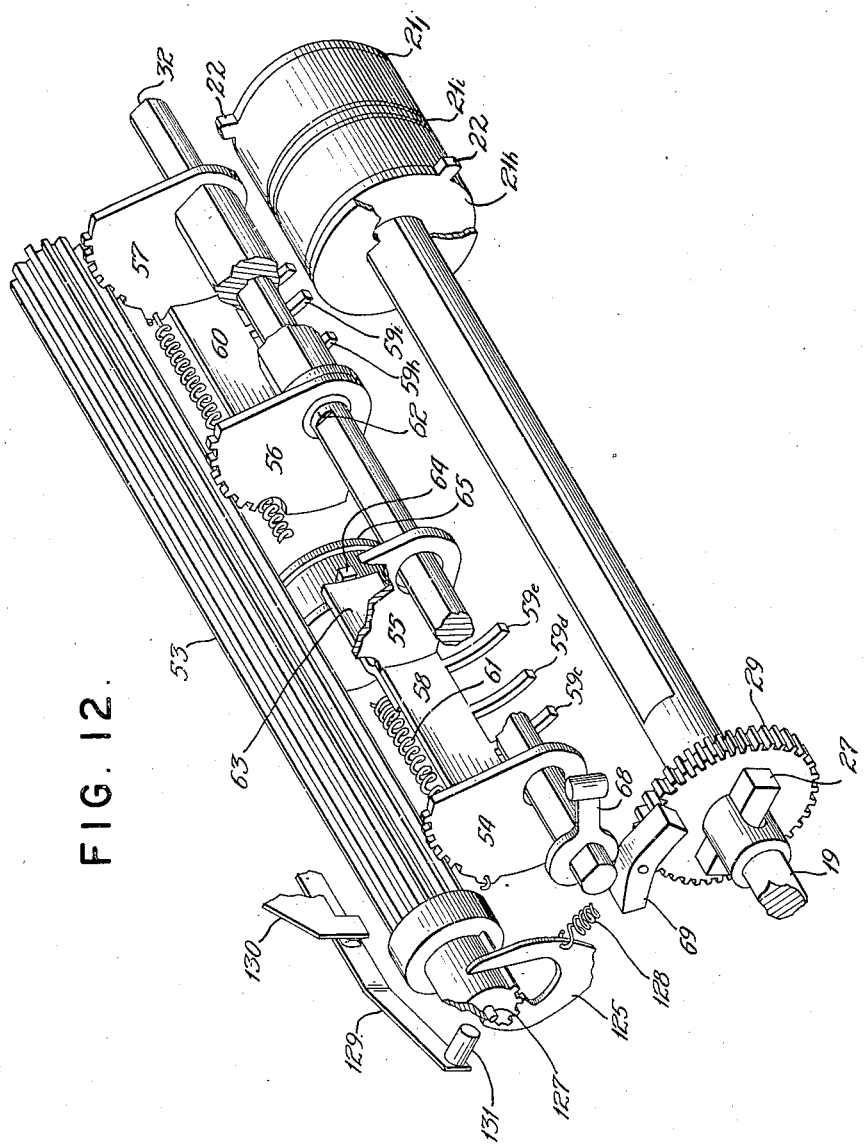
RICHARD W. MAY
INVENTOR
BY John J. Ragan
ATTORNEY Patented Oct. 11, 1949

2,484,638

UNITED STATES PATENT OFFICE 2,484,638

SELECTIVE CONTROL DEVICE FOR RADIO APPARATUS AND THE LIKE

Richard W. May, Cedar Rapids, Iowa, assignor to Collins Radio Company, Cedar Rapids, Iowa, a corporation of Iowa Application May 14, 1947, Serial No. 748,054

33 Claims. (Cl. 192—142)

1

This invention relates to automatic positioning mechanisms and more particularly to a control device for selectively determining the angular orientation of a rotatable shaft which is designed to undergo either a fractional revolution or one or more complete revolutions before arriving at a final selected orientation.

While devices according to the invention have been found particularly useful in the selective positioning of tuning elements or circuit control elements of radio apparatus, such for example as radio transmitters and receivers, it will be clear from the following disclosure that the principles of the invention can be embodied in any apparatus which is required to determine with utmost accuracy the angular orientation of a control shaft.

The invention is in the nature of an improvement upon the type of tuning control mechanism disclosed and claimed in application Serial No. 472,717, filed January 18, 1943; application Serial No. 515,250, filed December 22, 1943, and in various prior issued patents of Arthur A. Collins of which Patent #2,285,414, granted June 9, 1942, is typical.

In certain kinds of radio equipment employing a control shaft, such for example as a tuning condenser shaft, the complete tuning range can be effected by a single complete rotation of the shaft. In other kinds of radio equipment of which the well-known permeability or slug tuner is typical, the tuning motion is rectilinear and usually requires a control shaft which must be capable of undergoing more than one complete rotation in order to cause the tuning element to move over its complete positional tuning range. For simplicity of reference, the first type of device will be referred to herein as a single turn selecting control, and the second will be referred to as a multi-turn selecting control.

Accordingly, it is a principal object of this invention to provide an improved arrangement for automatically and selectively controlling the angular positioning of a control shaft, regardless of whether the said shaft is required to make more than one complete revolution or only a fractional revolution.

It is also an object of this invention to provide an improved device having interlocked electrical and mechanical control for selectively operating a multi-turn control shaft to a desired selected setting.

The type of device disclosed in said Patent #2,285,414, and in said pending application, employs a plurality of selector drums known respectively as a stop ring drum and a pawl select-

2 ing drum, in conjunction with a series of selectively shiftable and rockable pawls which pawls selectively engage recesses or notches in the said drum to determine the stopping of the shaft. The present invention has for another object a device which possesses the operating and control advantages of the said prior devices, but without requiring the use of such rockable pawls.

Another principal object of this invention is to provide a multi-turn shaft positioning device whose selective stopping requires the conjoint alignment of two separate selector members whose relative positioning with respect to a set of fixed stops, can be initially and independently adjusted to provide the equivalent of a vernier action in determining the desired stopping position for said shaft.

Another object is to provide a compact device for automatically controlling the tuning of a radio set or the like with a high order of accuracy.

A feature of the invention relates to a selective shaft-setting arrangement comprising a pair of selector drums which are selectively rotatable around parallel axes, one of the drums being selectively movable longitudinally with respect to the other drum to determine the number of complete revolutions of said other drum which are necessary to bring the said shaft to its final desired setting.

Another feature relates to a selective shaft-setting arrangement, comprising a pair of selector drums which are selectively rotatable around parallel axes, one of the drums being a turns-counting drum for the other drum, in conjunction with a series of fixed stop members common to both drums for determining the final stopping of said shaft.

Another feature relates to a selective shaft-setting arrangement, comprising a plurality of drum-like members rotatable around parallel axes and each carrying a plurality of stopping teeth which can be independently preset in any desired circumferential orientation around the respective drum axis, in conjunction with a set of fixed and longitudinally spaced projections whereby the said shaft can be stopped in a selected position determined by the planar alignment of a single tooth in each drum and a single one of said spaced projections.

Another object relates to a selective shaft-setting arrangement, comprising a plurality of drum-like members rotatable around parallel axes each carrying a series of radially projecting teeth which can be independently preset to any desired circumferential orientation around the respective drum axis, in conjunction with a plurality of fixed and longitudinally spaced projections; the planar alignment of one of said projections with a tooth in each of said drums determining the selective setting of said shaft, and means being provided for positively locking the said planarly aligned teeth and the said projection in fixed abutting relation.

Another feature relates to a selective setting arrangement for a rotatable shaft which is capable of being turned through more than one complete revolution to a final desired setting, the arrangement comprising a pair of drums rotatable around parallel axes and each carrying independently presettable stopping teeth; one of the drums being a turns-counting drum and slidable with respect to the other drum and the sliding position thereof being controlled by an automatic selector switch of the circuit-seeking type, the circuit-seeking member of which is movable as a unit with the said sliding movement of said turns-counting drum.

A further feature relates to a device for selectively setting a rotatable shaft which is capable of being turned through more than one complete revolution to a final desired setting, the device comprising a pair of rotatable toothed drums one of which is a turns-counting drum for the other drum and is formed in two separate sections which are independently slidable with respect to the said other drum for planarly aligning one tooth on a turns-counting drum section with one tooth on the said other drum, the relative angular displacement of said planarly aligned teeth determining the additional fractional turn which the said shaft is to undergo in order to arrive at its final setting.

A further feature relates to a device for selectively setting a rotatable shaft which is capable of being turned through more than one complete revolution to a final desired setting, the device having a turns-counting drum carrying a plurality of independently presettable radial teeth, said drum being formed of two sections which are rotatable as a unit but with the sections relatively slidable under control of a circuit-seeking automatic switch, the seeking elements of which is moved as a unit with the said drum sliding movement.

A still further feature relates to a shaft-setting device having a pair of toother drums with the teeth in each drum independently presettable around the drum; one of the drums being rotatable as a unit with the said shaft and the other drum being selectively rotatable and slidable to determine the number of revolutions for the other drum. The said sliding movement of said other drum is selectively controlled by an automatic switch of the circuit-seeking type, both drums co-operating with a fixed comb, the longitudinal spacing of the teeth on said drums being unequal so that for any given desired setting of said shaft, only a single tooth on each drum is in planar alignment with a single tooth of said comb.

A still further feature relates to a shaft-setting device of the type having a pair of rotatable selector drums each carrying a series of independently presettable radial projections, with the longitudinal spacing of the projections on each drum being unequal so that for any given desired setting of said shaft, only a single tooth on each drum is in planar alignment with a single tooth on the other drum.

A still further feature relates to a shaft-setting device of the type having a primary selector drum and a secondary selector drum, both drums being relatively rotatable and one of the drums being relatively shiftable with respect to the other drum, the said shifting movement being controlled by an automatic circuit-seeking switch and by a rotatable cam together with an electrical interlock between the switch and cam to selectively stop the cam when the movable member of the seeking switch arrives at the selected contact.

A still further feature relates to a shaft-setting device of the type having a primary selecting drum and a secondary selecting drum, each carrying a series of stop teeth in conjunction with a fixed comb so that the drums can be stopped only when a single tooth on each drum is in mutual abutting relation with a single tooth on the fixed comb together with special means operated in timed relation with respect to said drums to lock them in their final selected position.

A still further feature relates to the novel organization, arrangement and the relative interconnection and positioning of parts which cooperate to provide an automatic control unit for radio sets and the like.

Other features and advantages not specifically enumerated will be apparent after a consideration of the following detailed descriptions and the appended claims.

Fig. 11 is a composite schematic diagram of the electrical controls usable with the device, and with certain mechanical portions of the device also illustrated schematically.

Fig. 12 is a partial perspective view of part of the mechanism for locking the device in its selected positions.

Fig. 13 is a detailed cross-sectional view of part of the device.

Figure 1:
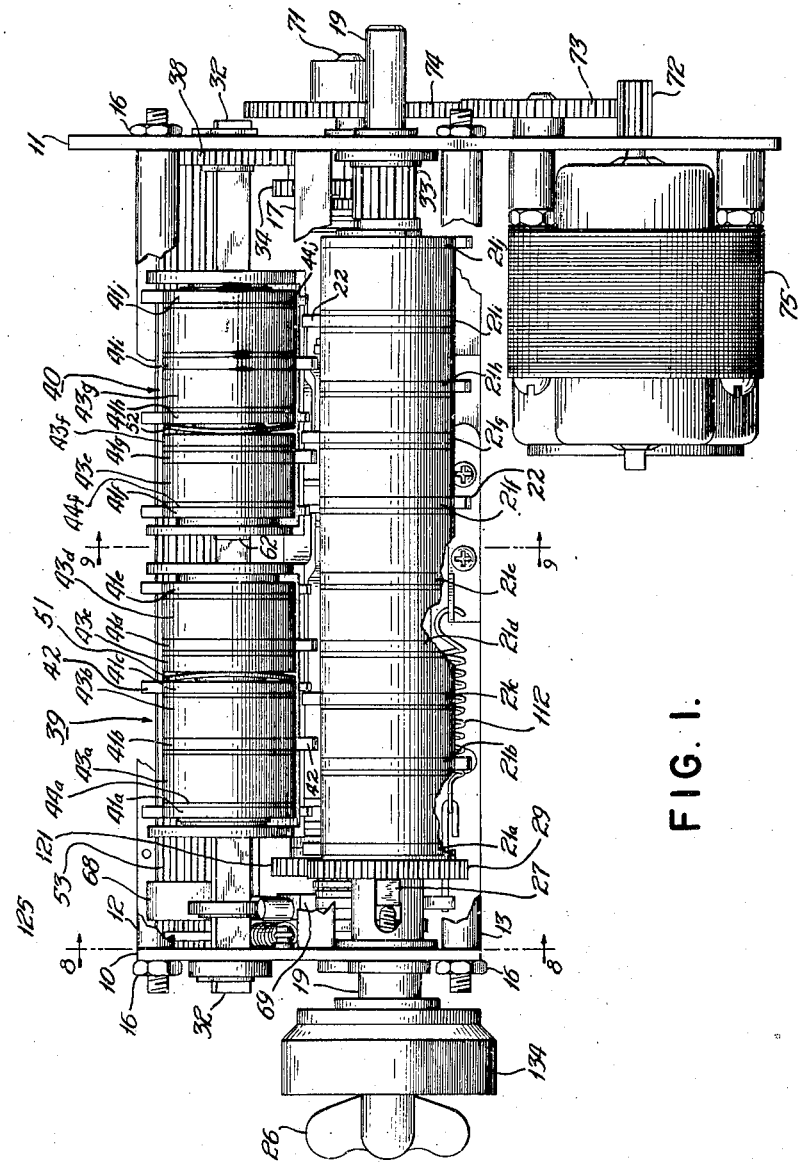
Figs. 1, 2, 3, 4 and 5 are respectively right side view, left side view, bottom view, top view and front view of a device according to the invention.

Referring more particularly to Figs. 1 to 4, the various working parts of the device are supported in operative relation by a frame work consisting of a front plate 10 and a rear plate 11, which are united by four shouldered tie rods 12, 13, 14, 15, and respective fastening nuts 16. Also extending between the plates 10, 11, is a metal bar 17, having a set of ten inwardly projecting teeth 18a—18j (see Figs. 8, 9, 10A, 10B, 10C), constituting what may be termed a stopping comb for purposes to be described.

The shaft 19 which is to be selectively positioned is mounted for rotation in suitable bearings in the plates 10 and 11, and is arranged to be coupled to the adjusting or tuning element of a radio apparatus, such for example as the permeability core 20 (Fig. 11), of any well-known type of permeability tuner such as used in the radio art. It will be understood of course, that the invention is not limited to any particular tuning or adjustment device but is particularly adapted to a tuning device which is arranged to undergo either a fractional turn, or one or more complete turns before it arrives at its final selected position. For example, in the case of the well-known permeability tuner, the core 20 is coupled to a threaded shaft 20a which is in threaded engagement with a fixed threaded abutment 20b, so as the shaft 20a turns, it moves the core 20 longitudinally a predetermined extent. In order to effect the maximum longitudinal adjustment of the core 20, it is necessary to turn the shaft 20a through a number of complete turns. In the particular example to be described, it will be assumed that the device 20 requires for its maximum longitudinal adjustment, ten complete turns of the shaft 20a, and when the shaft 20a has been given the required number of complete turns it is given an additional fractional turn so as accurately to locate the core 20 within its inductive winding 20c.

Shaft 19 (see Fig. 7) carries a series of ten stop rings 21a—21j, each ring having a single radial projecting stop tooth 22. These stop rings are unevenly spaced apart along shaft 19 by a series of intervening spacers 23a—23i. The stop rings with their intervening spacers may be considered as a single stop ring drum which is arranged to rotate as a unit with shaft 19, but wherein each of the stop rings can be individually preset with its tooth at the desired radial position, whereupon the stop rings can be clamped so as to rotate as a unit with shaft 19. To effect this, the rings and spacers are clamped together as a pile-up by means of an annular shoulder 24 which is set into shaft 19, the opposite or forward end of that shaft being hollow to receive the end of a clamping screw 25 which carries at its forward end a clamping wing nut 26. In engagement with the unthreaded end of member 25, is a bar 27 which passes transversely through a slot 28 in the shaft 19, this bar abutting against the gear 29 which transmits rotary motion to shaft 19 and which also acts as the other clamping member for the said pile-up. For this purpose, gear 29 is slidably adjustable on shaft 19 so that when the member 25 is turned in one direction, it forces gear 29 against the end of the pile-up and consequently when the gear 29 is driven in the manner described hereinbelow, it rotates shaft 19 and the stop ring drum as a unit. Located between each stop ring 21 and one of the adjacent spacers 23, and also between the gear 29 and the first stop ring 21a, is one of a series of thin metal discs 30a—30j. It will be observed that the shaft 19 has a flat 31, and the discs 30a—30j have corresponding flats so that they are compelled to rotate with the shaft 19. On the other hand, the stop rings 21a—21j and the spacers 23a—23i do not rotate with shaft 19 until they are clamped together as a unit between gear 29 and member 24. Preferably, the discs 30a—30j have flexible peripheries and the right-hand face of each of the spacers 23a—23i is undercut so as to provide only an annular shoulder which engages the adjacent disc 30. By this arrangement, when nut 26 is backed up to relieve the clamping pressure, it is possible to preset any one or more of the stop rings around shaft 19 without disturbing the previous settings of the remaining stop rings. By reason of the flexible periphery of the thin metal disc 30a—30j, this presetting is facilitated.

Since the stop ring drum has ten presettable stop rings, it is then possible to selectively stop the shaft 19 in any one of ten predetermined angular positions of any complete turns.

Also mounted in suitable bearings in the plates 10, 11, is another shaft 32 (see Figs. 4, 5, 7, 8 and 12) which is rotated in reduced speed relation with respect to shaft 19, so that shaft 32 undergoes only one revolution for each 12 revolutions of shaft 19. For this purpose, shaft 19 has fastened thereto a pinion 33 which drives the speed reducing gear train 34—38 (see Figs. 1 and 6). Mounted for sliding movement on shaft 32 are two counting drum sections 39, 40, which count the number of complete turns through which the shaft 19 is to be selectively rotated. In the particular example shown, the shaft 19 is arranged to undergo a fraction of one turn to ten complete turns. The counting drum section 39 consists of a set of five stop rings 41a—41i, each ring having a single stopping tooth 42. The stop rings 41a—41e are unevenly spaced by intervening spacers 43a—43d and between each spacer and the adjacent stop ring is one of a series of thin flexible-margined metal discs 44a—44e. As in the case of the spacers 23a—23i, the spacers 43a—43d are undercut on their side faces. The turns-counting drum section 40 likewise consists of five single toothed stop rings 41f—41j with the intervening spacers 43e—43h, and intervening flexible thin metal discs 44f—44j.

Each of the two pile-ups constituting the drum sections 39 and 40 is carried by a corresponding sleeve 45, 46 (see Fig. 7), which has its bore at one end provided with a flat to engage the corresponding flat on the shaft 32. Each sleeve has at one end an integral flange 47, 48, against which the corresponding pile-up is clamped. Also fastened to the sleeves are respective retainer rings 49, 50 against which the opposite ends of the respective pile-ups are clamped. The periphery of each sleeve 44, 45, has a flat to engage the corresponding flat in each of the discs 44a—44j. However, the stop rings and spacers of these drum sections, when the stop ring drum is unclamped, are capable of being individually adjusted and preset around the shaft 32. The clamping pressure between the elements of drum 39 is effected by a bowed spring 51. Likewise, the clamping pressure between the elements of drum section 40 is effected by a bowed spring 52.

As pointed out above, the shaft 19 is required to undergo either a fraction of a turn, to as much as ten complete turns, and is required to be selectively stopped at any preselected point during the particular selected turn. In other words, the drum sections 39 and 40 constitute a turns-counting drum, and the stop ring drum on shaft 19 constitutes the radial angular setting drum.

The stop rings in the drums are so spaced by their respective spacers, that for any desired setting of shaft 19, one and only one, stop ring of the series 21a—21j, can be in planar alignment with one of the stop rings 41a—41j. In other words, the rotation of the counting drum sections 39, 40, and their selective sliding movement on shaft 32 determine which one of the toothed stop rings of the turns-counting drum sections is in abutting locking engagement with the tooth of the desired stop ring 21a—21j. Therefore, the previous angular setting of the stop rings 21a—21j will determine the extent of incremental rotation or fractional turn that shaft 19 will have to undergo after it has completed its desired number of complete turns under control of the counting drum sections 39, 40, in order that the shaft 19 shall arrive at its final selected position. In other words, the stop rings 21a–21j and the stop rings 41a–41j, are unevenly spaced so as to provide in conjunction with the fixed teeth 18a–18j above described, a vernier action so far as the rotation of shaft 19 is concerned.

Figure 10C:
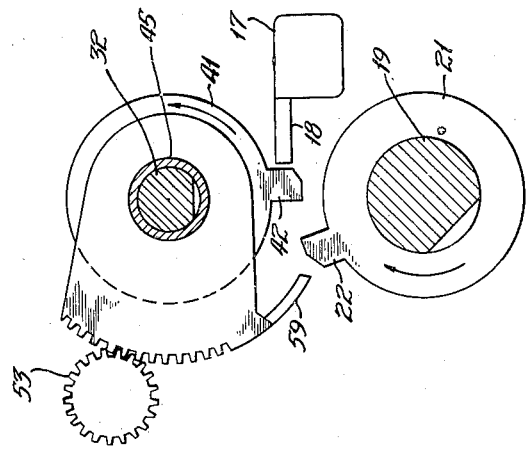
Figs. 10A, 10B, 10C, show the stopping control elements in three different stages of the operation of the device.
Figure 10B:
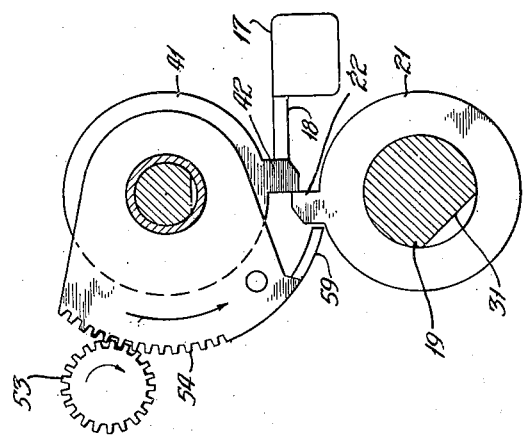
Figure 10A:
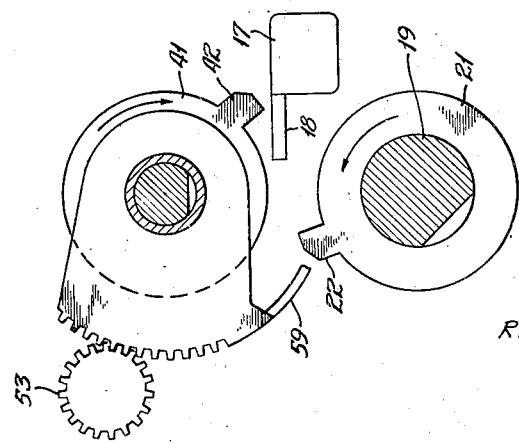

Referring to Figs. 10A, 10B and 10C, it will be seen that the shaft 19 can be stopped in its clockwise motion only when the tooth 22 of a stop ring 21 is in planar alignment with the tooth 42 of a stop ring 41, and only when the tooth 42 is in alignment with one of the fixed teeth 18 of the series 18a–18j. This relation is shown in Fig. 10B, which represents a final selected or "at rest" position of the shaft 19. Unless the three elements 22, 42 and 18 of any given set are in planar alignment, it will be clear therefore that the shaft 19 is not stopped. The final stopping of shaft 19 is therefore determined by the particular one of the teeth 22a–22j, which is in planar alignment with one of the teeth 42a–42j, and with one of the fixed teeth 18 of the series 18a–18j.

Figure 7:
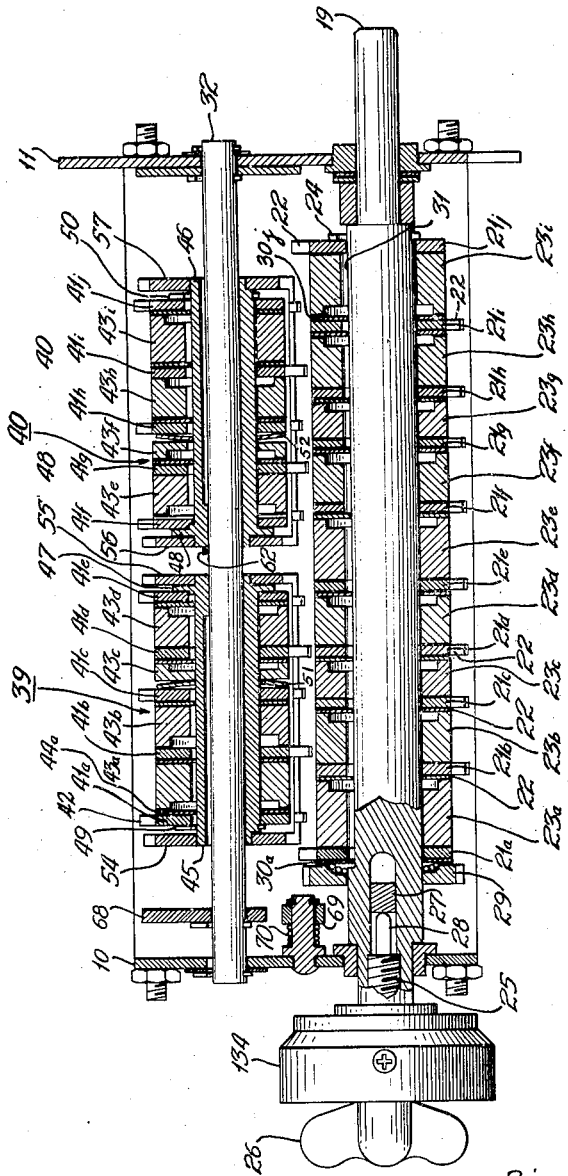
Fig. 7 is a cross section of Fig. 5, taken along the line 7—7 thereof, and viewed in the direction of the arrows.

Before the device undergoes its selecting movement, it is returned to a normal or homing position in which case the shaft 19 is rotated in a counter-clockwise direction (as seen in Fig. 10A). Fig. 10C shows the device undergoing its selecting movement, wherein the shaft 19 is rotating clockwise and the shaft 32 is rotating counter-clockwise, and just before tooth 22 engages tooth 42 and tooth 18. In order positively to lock the shaft 19 in its final selected position, that is, in order to lock the elements 22, 42 and 18 (Fig. 10B), in their abutting relation, there is provided an elongated pinion 53 which at the end of the selective cycle is rotated clockwise (as seen in Fig. 10B) through a small angle. Pinion 53 is in mesh with the gear sectors 54–55, 56–57 (Figs. 7 and 12). Sectors 54–55 are integrally united with an arcuate plate 58 to form therewith a rocker cradle, and the forward edge of member 58 is formed with a series of five curved teeth 59a–59e, which are in planar alignment with the respective rings 41a–41e. Likewise, the gear sectors 56–57, are integrally fastened to a curved plate 60 having a series of curved teeth 59f–59j, which are in planar alignment with the rings 41f–41j. The members 54–57 have openings through which the shaft 32 freely passes, and when the pinion 53 is rotated as above-mentioned, it causes the teeth 59a–59j to be moved into abutting engagement with the particular tooth 22 which is in engagement with the selected tooth 42 and the fixed tooth 18 as shown in Fig. 10B. The mechanism remains in this locked relation until a new setting of shaft 19 is desired.

A coiled tension spring 61 (Figs. 2 and 12) is fastened at opposite ends to the plates 54 and 57 so as normally to urge two rocker frames and their respective drum sections 39, 40, towards each other. Thus, as the left-hand drum section 39 moves along shaft 32, it carries with it the teeth 59a–59e. Likewise, as the drum section 40 moves along shaft 32, it carries with it the teeth 59f–59j. For purposes of clarity in the drawing, the two drum sections are omitted in the perspective view of Fig. 12. The spring 61 tends to pull the drum sections 39, 40, together so that their adjacent ends abut against a ridge 62 on shaft 32. In this position, the lug 63 attached to member 58 abuts against a radially extending pin 64 on a slidable cam follower 65. Also the lug 66 attached to member 60 engages the said pin 64. The follower 65 is adapted to be selectively moved in either direction and to be stopped at a desired point in its travel. When the follower 65 moves to the left, it likewise moves the drum section 39 to the left but without disturbing the drum section 40. This relation of the drums is shown in Figs. 1, 3, 4 and 7. On the other hand, when the follower 65 moves to the right, it moves the drum section 40 to the right but without disturbing the drum section 39 which however is moved to a position against the ridge 62 by spring 61.

As will be described, the follower 65 is moved in either direction by a two-way lead screw 67. Thus by making the turns-counting drum in two sections each of which is movable independently of the other, and by using a two-way lead screw 67, the overall linear movement of the turns-counting drum as a whole is reduced by one-half and each drum section 39, 40, can be made identical. That is to say, the spacers 43a–43d can be identical in width with the spacers 43i–43e. If a single continuous drum were employed, the spacers 43a–43i would all have to be of unequal widths so that only one stop ring of the counter drum can line up with a stop ring 21a–21j. This arrangement also reduces the overall length of the device.

Figure 4:
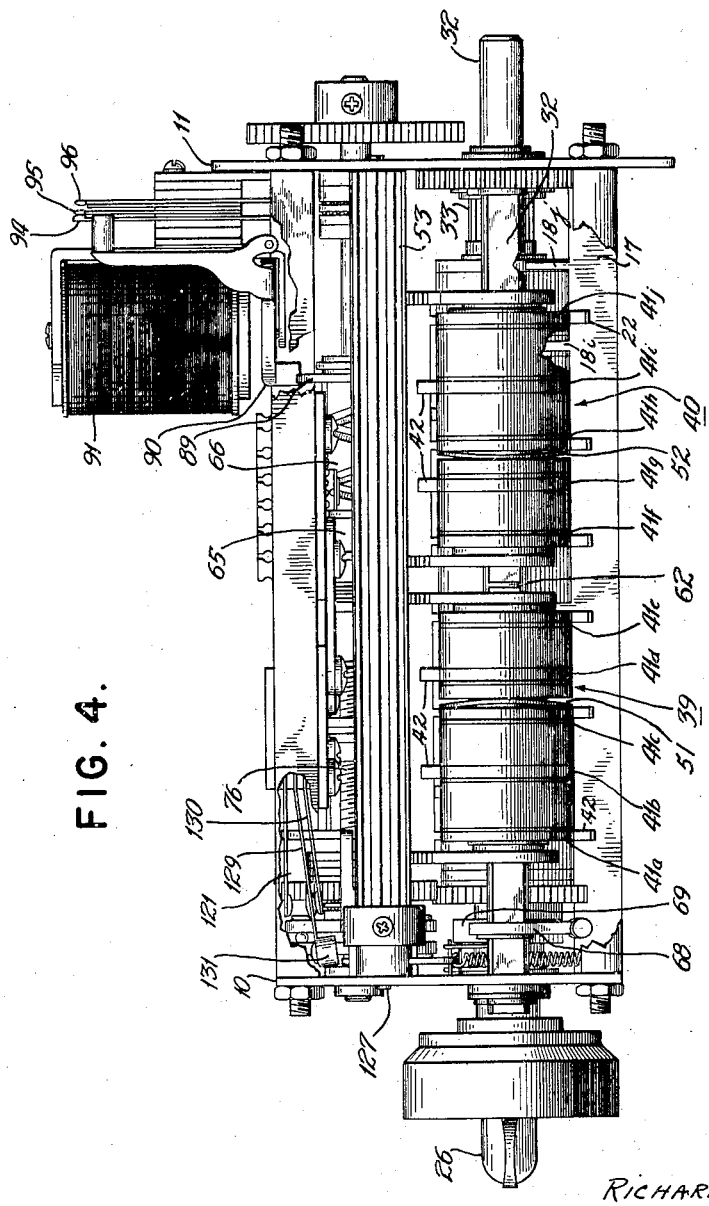
Figure 5:
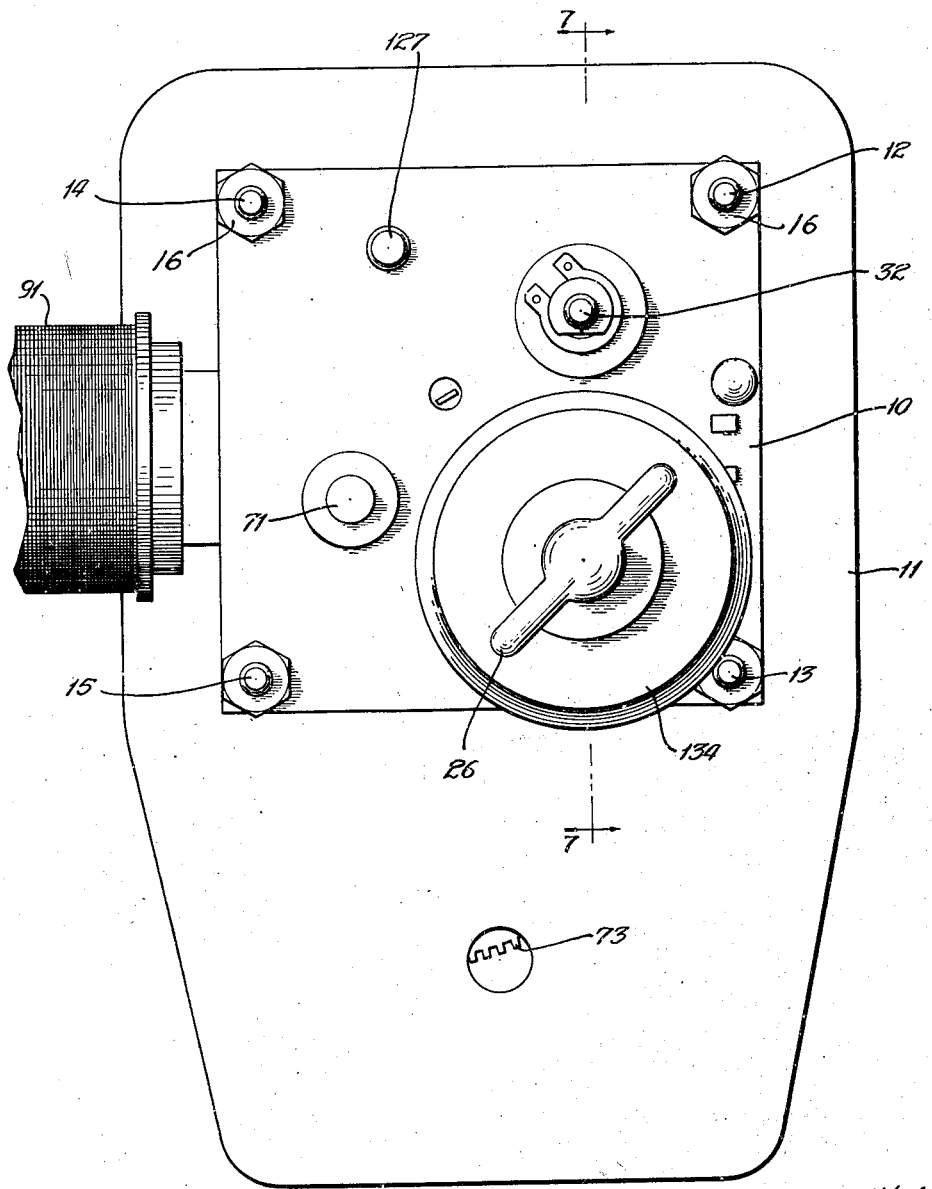
Figure 8:
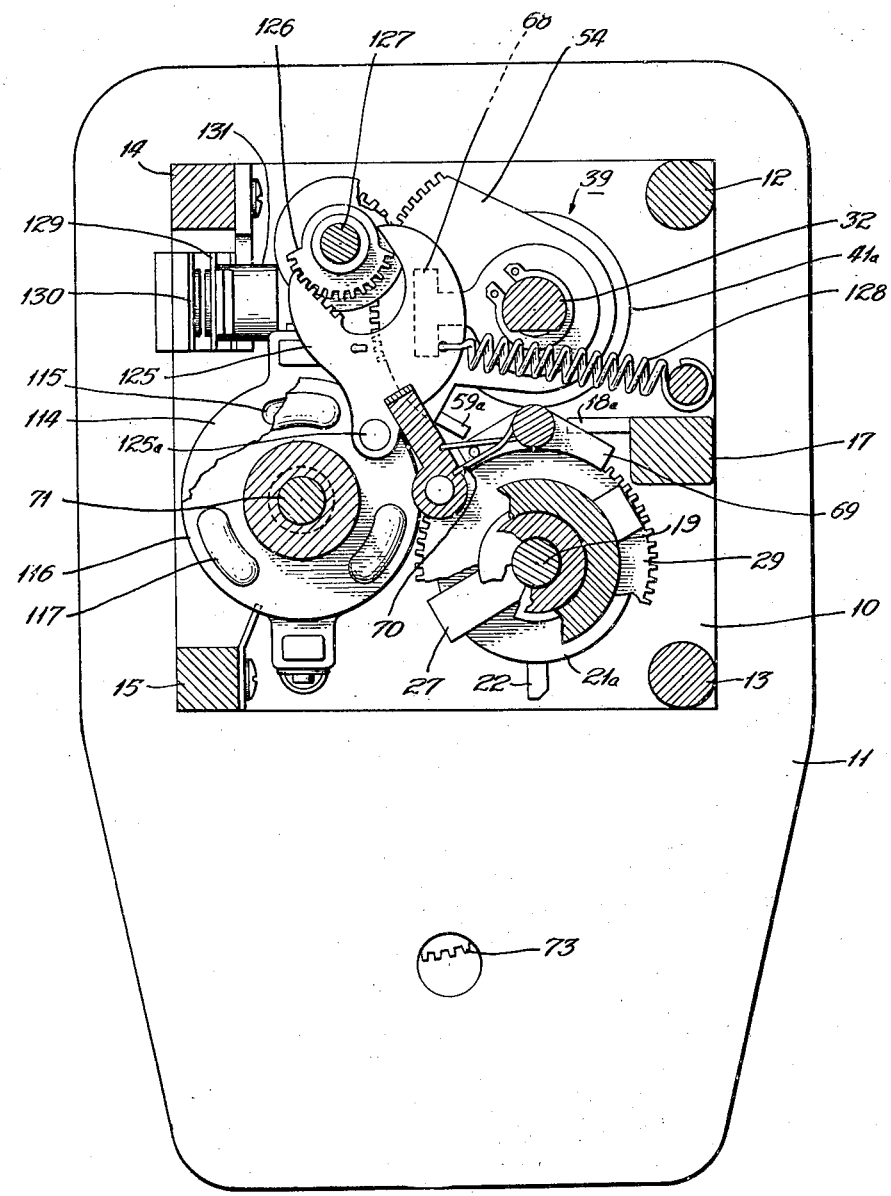
Fig. 8 is a cross section of Fig. 1, taken along the line 8—8 thereof, and viewed in the direction of the arrows.
Figure 9:
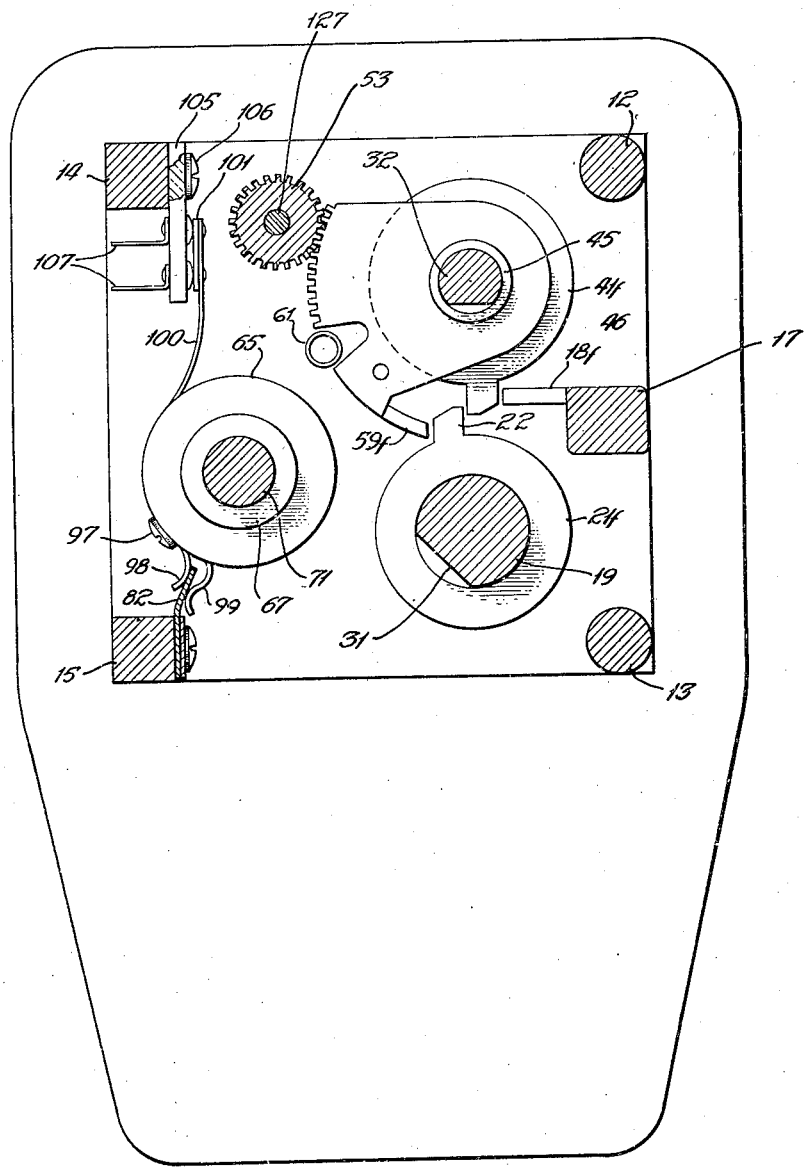
Fig. 9 is a cross section of Fig. 1, taken along the line 9—9 thereof, and viewed in the direction of the arrows.

In order to limit the total number of turns to which the shaft 19 can be turned in either direction, there is fastened to shaft 32 an arm 68 (see Figs. 4, 8 and 12). At the limit of rotation of shaft 19, that is to say, at the end of the tenth complete turn, arm 68 engages a pivoted latch 69 to urge the latter into the path of the locking bar 27, thus preventing further rotation of shafts 19 and 32. The latch 69 is normally held by spring 70 out of the path of arm 27. Thus, after ten complete revolutions of shaft 19, starting from the reference or home position, the arm 68 urges the latch 69 into the path of the locking bar 27 to stop shaft 19. This stopping action is necessary in order to establish a starting point or home position for the mechanism. Without this limiting action after the conclusion of the maximum number of turns for which the device is designed, the device might be damaged.

Figure 2:
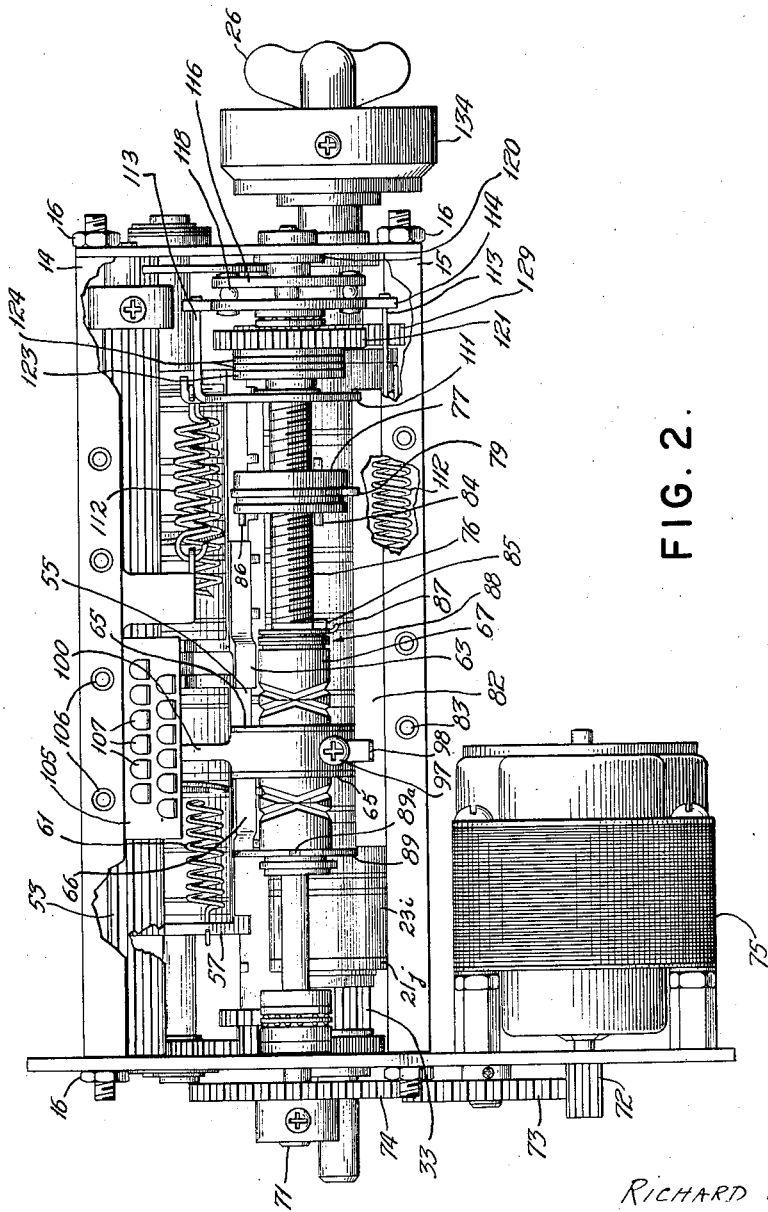
Figure 3:
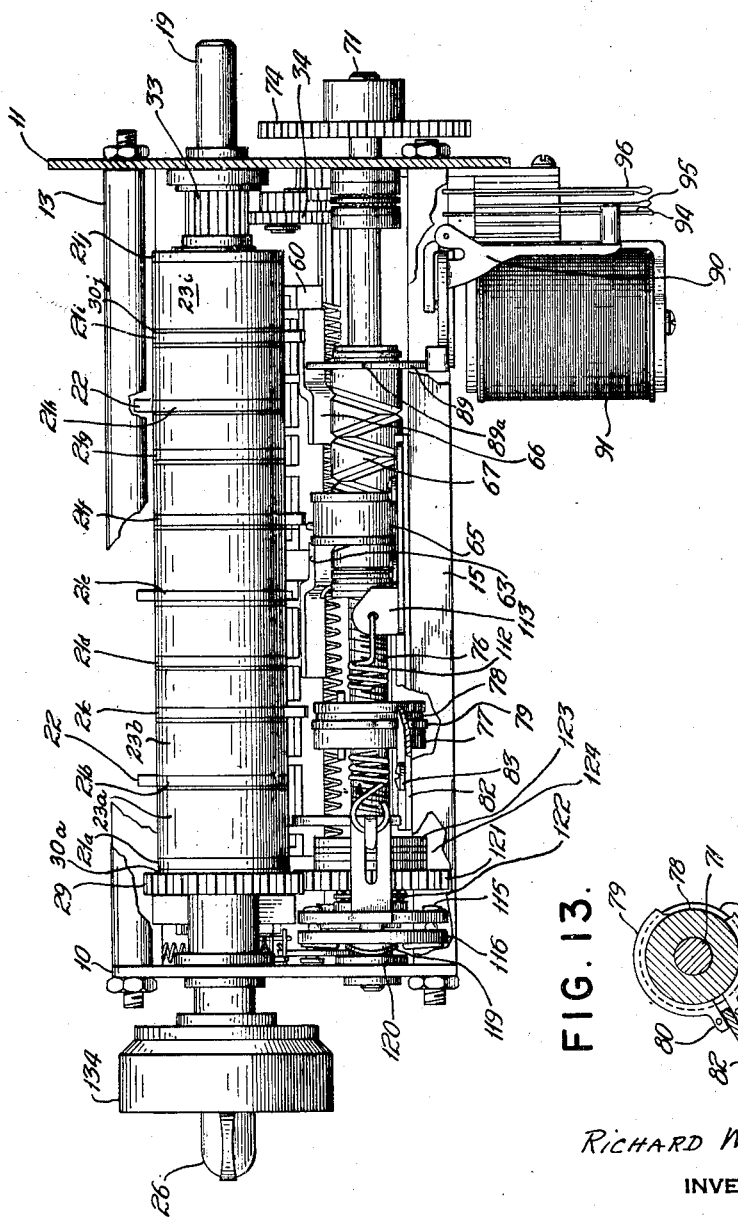
Figure 6:
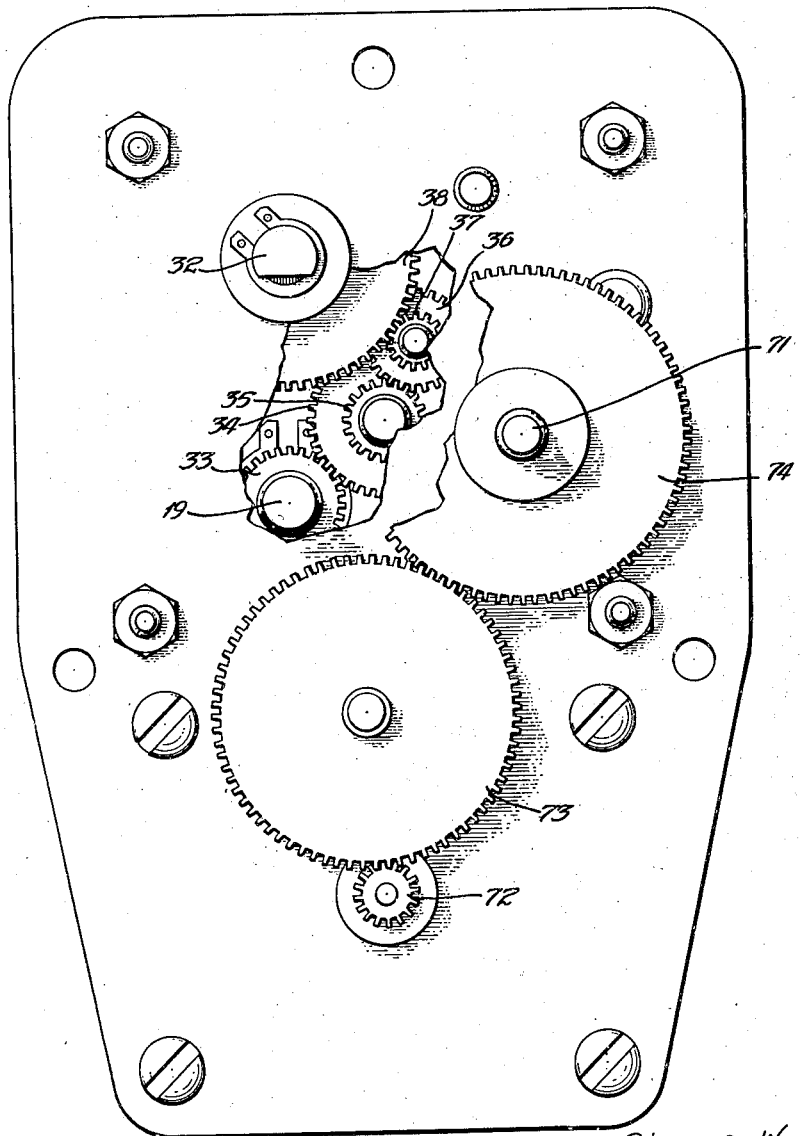
Fig. 6 is a rear view, with part of the rear plate removed, to show more clearly certain of the driving gears.

For the purpose of controlling the selective longitudinal movement of the drum sections 39, 40, there is provided a timing and control shaft 71 which is supported in suitable bearings in plates 10 and 11, and extends parallel to the shafts 19 and 32 (see Figs. 2, 3 and 6). Shaft 71 is driven by the pinion 72 through idler gear 73, which meshes with gear 74, fastened to shaft 71, pinion 72 being driven by a suitable reversible electric motor 75, fastened to the depending portion of plate 11. The front end 76 of shaft 71 is threaded and engages a threaded follower 77. Follower 77 has a peripheral groove 78 (see Fig. 13) in which is located a split ring 79, the ends 80 and 81 of which slidably engage the plate 82 which is fastened by screws 83 to the rod 15. Thus as shaft 71 rotates, the follower 77 is constrained to move either to the right or left, depending upon the direction of rotation of said shaft 71. The arrangement is such that when the follower 77 reaches the end of its transit in one direction, the pin 84 engages a pin 85 extending through shaft 71, so that follower 77 is constrained to rotate with the shaft. Another pin 86 carried by the follower 77, engages the dog 87 carried by one of the metal discs of a friction disc clutch 88. Consequently, the cylindrical cam 67 is then rotated in unison with the rotation of shaft 71. It should be observed that cam 67 is in the form of a sleeve which is rotatable around shaft 71 but is suitably prevented from sliding movement on that shaft. This cam has a pair of reversely pitched cam grooves or threads. The end of cam 67 also carries an integral disc 89 having four locking notches 89a (see Figs. 2 and 3) located 90° apart around the disc periphery. Cam 77 continues to rotate until the pivoted armature 90 of a control relay 91 is deenergized to allow the latching end of this armature to enter one of the notches 89a to restrain further rotation of cam 67. Relay 91 is suitably fastened to plate 11 and carries two sets of contact springs 92—93 (Fig. 11), and 94—95—96, which control the application of current to the motor 75 and which also control its direction of rotation.

The cam follower 65 has fastened to its periphery by screw 97 (see Fig. 9) a pair of metal fingers 98, 99, which slidably engage opposite faces of strip 82, so as to prevent rotation of the follower while providing an electrical grounding connection to the frame of the device. Also fastened to follower 65 is an arm 100, which carries at its end a wiper contact or brush 101, arranged to wipe over a series of fixed bank contacts 102a—102j. The wiper 101 is arranged to make contact with neutral contacts 103, 104, when the device is to be manually operated. Preferably, the fixed bank contacts are carried by an insulator strip 105 fastened by screws 106 to the rod 14, suitable circuit connecting lugs 107 being provided for the respective fixed contacts. The brush 101 and the fixed contacts constitute an automatic selector or finder switch, and the fixed contacts are wired respectively to corresponding fixed bank contacts 108a—108j of a remotely located manually settable rotary switch 132. Arranged to wipe the contacts of the selector switch 132 is a metal disc 109 having a peripheral notch 110 for purposes to be described. The arrangement is such that the cam follower 65 sweeps the brush 101 back and forth across the contacts 102a—102j until an ungrounded contact is reached, which ungrounded contact represents the selected setting for the tuning device 20. During the sweeping motion in one direction, the drum 39 is moved in unison with follower 65; while in the opposite sweeping motion the other drum section 40 is moved in unison with the follower.

In the at-rest position of the device, that is after it has completed a selective cycle, the follower 77 (Fig. 2) is at the extreme right-hand end of thread 76, but before it reaches this extreme position and just after the drums have been selectively positioned with the desired teeth 22, 42 and 18 in abutting planar alignment (see Fig. 10B), the opposite end of pin 84 engages a clutch plate 111 which has a central opening through which shaft 71 freely passes. Until this plate 111 is engaged by pin 76, it is held in its right-hand position (Fig. 2) by a pair of retractile springs 112, each having one end anchored respectively to the rods 14, 15, and the other end of each spring being hooked to diagonally opposite points on plate 111. Plate 111 has a notch in its periphery in slidable registry with the guide plate 82 so as to prevent the plate from rotating. Plate 111 is also integrally joined by arms 113, to another plate 114, through which shaft 71 freely passes. Plate 114 has three arcuate recesses 115 for purposes to be described.

Also freely surrounding the shaft 71 in spaced relation to plate 114 is a similar plate 116 (see Fig. 8) having a set of three arcuate recesses 117, similar to and adapted to register with the recesses 115 in plate 114. A ball bearing 118 is provided in each pair of opposed recesses and these recesses have their bottoms of opposite inclination so that when the plate 114 is forced to the right (Fig. 2) by nut 77, the plate 116 is turned through a definite angle. A spring 119 is located between the bearing flange 120 and plate 116 and normally presses the plate 116 against the balls. Located between the hub of plate 115 and the face of gear 121, is an end thrust ball bearing 122, and fastened to shaft 71 is a driving disc 123. Located between disc 123 and the face of gear 121, are friction discs 124. Thus, before pin 84 engages plate 111, the tension of springs 112 maintains gear 121 in frictional driven engagement with shaft 71, and therefore rotates the stop ring drum, since gear 121 is in mesh with gear 29. On the other hand, when pin 84 engages plate 111 at the end of the selecting cycle, the tension of springs 112 is overcome, thus breaking the frictional drive between 123 and 124 and bringing the stop ring drum and shaft 19 to rest. A slight additional movement of nut 77 moves clutch plates 111 and 114 to the right and by reason of the inclined faces in the cooperating arcuate recesses in plates 114 and 116, the latter plate is turned through a predetermined angle.

Pivotally fastened to plate 116 (see Fig. 8) at 125a, is a bifurcated member 125 which has one of its jaws provided with gear teeth in mesh with a sector gear 126 fastened to shaft 127 and to which is also pinned the pinion 53. A spring 128 normally holds the member 125 in the position shown in Fig. 8 in which position the teeth 59a are out of the path of the stopping ring teeth 22. However, when plate 116 is turned as above described, the member 125 is moved against the tension of spring 128, causing a corresponding rotation of sector gear 126 and of the pinion 53. This rotation of pinion 53 rotates the rocker frames 54—55, 56—57, whereby the teeth 59a—59j are moved to the position shown in Fig. 10B, wherein one of these teeth 59a—59j is in planar alignment with a single one of the teeth 22 on the stop rings, shown respectively in the homing position, the final selecting position, and the setting up position.

Mounted on the insulating strip 105 which carries the selective bank contacts 102a—102j is a flexible contact spring 129 (see Figs. 4 and 8) which carries an operating button 131, and this spring is normally closed on its associated contact spring 130 when the device is undergoing homing and selective operation. However, when the selecting cycle is completed and the member 125 is moved to lock the parts in their mutual stopping relation, the said member 125 engages the insulating button 131 attached to spring 129 to finally open the circuit of motor 75.

As mentioned above, in connection with Fig. 2, shaft 71 drives gear 121 through disc clutch 123—124. Gear 121 drives the tuning control shaft 19 through gear 29; while on the opposite end of shaft 19 the pinion 33 drives the turns-counting drum sections 39, 40, through gears 34—38. This gear train 34—38 is selected so that the turns-counting drum sections rotate through approximately 330° while the shaft 19 rotates through its maximum number of turns, for example ten.

Before describing the complete sequence of operations in setting up a new position for shaft 19, reference should be had to Figs. 10A, 10B, 10C, which are simplified sketches of the essential co-operating stopping parts for shaft 19. In Fig. 10B, the mechanism is at rest in its set-up selecting position and with one of the turns-counting drum stop teeth 42 abutting against the fixed tooth 18, and with one of the teeth 22 of the stop ring drum clamped between 42 and 59. When a new position for shaft 19 is required, the member 109 of the manual selector switch 132 is rotated, causing the motor 75 to rotate the stop rings 21a—21j in a counter-clockwise direction (Fig. 10A). Previous to this operation however, the clamping teeth 59a—59j are moved in a clockwise direction out of the path of the stop ring teeth 22a—22j. These rotations of 21a—21j and of 41a—41j continue until the parts reach the position shown in Fig. 10A at which time the arm 68 (Figs. 1, 4 and 7) and latch 69 cooperate with bar 27 to positively stop shaft 19. This represents the home or reference position, wherein the pin 86 engages the dog 87 and causes rotation of the cylindrical cam 67, thus moving the brush 100 in search of the ungrounded bank contact 102a—102j. By reason of the fact that the cam 67 has two cam slots of opposite pitch so long as the said cam continues to rotate, it causes the brush 70 to move first in one direction and then in the opposite direction so as to completely traverse the bank of fixed contacts. Also, as the said brush 100 moves back and forth seeking the ungrounded contact, the turns-counting drum sections 39, 40, are moved in unison axially therewith, first one section being moved and then the other until the ungrounded contact is found. When brush 100 reaches this ungrounded contact, the relay 91 is deenergized to cause armature 90 to latch with the notch in disc 89, locking the cam 67 and brush 100 against further movement. This leaves only one stop ring 21a—21j in such a position that only one of the stop rings 42a—42j in the turns-counting drum sections is in planar alignment therewith. When relay 91 is deenergized, it causes reverse rotation of the motor thus driving the rings 21a—21j in clockwise direction, and the rings 41a—41j in counter-clockwise direction, this rotation continuing until the proper teeth 18, 42 and 22 are in mutual abutting and stopping relation (see Fig. 10B). Thereupon, the disc clutch 123, 124, slips, and after sufficient time delay the pinion 53 is rotated to lock the parts in selected position.

Fig. 11 shows in generalized schematic form, the electric controls and certain of the mechanical parts, all of which bear the same designation numerals as the corresponding parts in Figs. 1–10. The parts are shown in Fig. 11 at rest with the tuning device 20 in a position corresponding to contact 108a of the manual selector switch 132. When it is desired to move device 20 to a different setting, for example that corresponding to contact 108j, member 109 is turned manually to bring the notch 110 into registry with contact 108j. The previously ungrounded contact 102a as well as the intervening contacts 108b—108i are thereupon grounded, completing a circuit from the grounded member 82, brush 98, brush 101, contact 102a, contact 108a, member 109, conductor 133, winding of relay 91, and thence through the grounded battery or other power source 134. The operation of relay 91 connects this power source through the relay contacts to the winding of motor 75, causing the shaft 71 to rotate in such a direction as to rotate the stop rings 21a—21j counter-clockwise, and rotating the turns-counting rings 41a—41j clockwise to a home or reference position. In this position, nut 77 engages and drives the cam 67. As this cam rotates, by reason of its double reverse cam grooves it causes the brush 101 to slide back and forth over contacts 102a—102j. This axial movement of brush 101 is coordinated with the back and forth movement of the drum sections 39, 40. When the contact 102j is finally reached, the above-described circuit for relay 91 is open, causing this relay to release its armature 90 which thereupon enters into blocking engagement with the disc 89 on the cam 67, thus preventing any further rotation thereof and therefore locking brush 101 in its selected position. The release of relay 91 also reverses the direction of the current to the motor 75 which thereupon turns shaft 71 in such a direction as to rotate the stop rings 21a—21j clockwise and the counting drum rings 41a—41j counter-clockwise. By reason of the previously described axial setting of the drum section 40, the appropriate ring 42j is now in planar alignment with the stop ring 21j and also with the corresponding fixed tooth 18j. The parts are therefore in their mutual stopping position as represented in Fig. 10B, and nut 77 engages the clutch plate 111 resulting in the turning of pinion 53 and the teeth 59a—59j to lock the parts in this mutually stopped position. It should be observed that the threaded portion 76 of shaft 71 is such as to enable a sufficient time to elapse before pinion 53 is turned to lock the parts, thus accommodating the maximum number of turns that shaft 19 may have to undergo, for example ten.

Shortly after nut 77 has reached the limit of its movement in the setting-up direction, the member 125 (Fig. 8) which controls the locking movement of teeth 59a—59j, engages the limit switch button 131 and opens the limit switch contacts 129, 130, and the motor power circuit, whereupon the motor 75 comes to rest. The parts are now positively locked in their selected or set-up position.

Should it be desired to change the relation between any bank contact (for example contact 102j) and the particular angular setting of the shaft 19, this can be done by automatically positioning shaft 19 as above described, then unloosening nut 26 to unclamp the pile-up of stop rings. The shaft 19 is then free to be manually turned by knob 134 to the desired angular setting. This causes a change in the relative radial position of tooth 21j around shaft 19, but without disturbing the previous radial settings of the remaining teeth 21a—21h. The turning of shaft 19 being geared to the counting drum shaft 32, as shaft 19 is turned for the new presetting adjustment, it automatically presets the counting drum shaft. This leaves the latter in such a position that it counts out the proper number of complete turns of shaft 19 before selective stopping occurs as above described. The nut 26 can then be tightened to clamp the pile-up of stop rings, and the device is in readiness for any desired automatic setting.

Assuming that the device 21 is to be moved to different positions to represent different frequency channels, the following will summarize the sequence of operations necessary to effectuate a channel selection.

1. The new channel is selected by turning the manual selector switch 132 so that its notch 110 is in registry with the desired channel contact.

2. Relay 91 operates and supplies power to the driving motor 75.

3. Motor 75 rotates the power shaft 71.

4. Follower 77 backs away from clutch 111 and moves the locking fingers 59a—59j away from the stopping ring teeth.

5. Gear 121 is clutched to shaft 71 rotating the stop ring drum and the turns-counting drum sections towards home position.

6. After reaching home position, follower 77 engages pin 85 and immediately thereafter causes rotation of cylindrical cam 67.

7. The finder swtch wiper 101 is driven by the cylindrical cam to seek an open circuit and simultaneously the cylindrical cam moves the counter drum sections axially.

8. When an open circuit is found by the finder switch wiper 101, relay 91 is deenergized to lock the cylindrical cam against rotation and at the same time to reverse the motor rotation.

9. The engagement of the armature of relay 91 with the notch in the cam disc 89 accurately lines up one, and only one, stop tooth of the appropriate counting drum 39 or 40 with a corresponding stop ring 21 and a corresponding stationary finger 18.

10. The counting drum by reason of the 12 to 1 gear reduction with respect to the stop ring drum serves to count the number of complete revolutions required for the main shaft 19.

11. When the selected stop finger on the appropriate counter drum reaches the stationary finger 18, it provides a fixed stop for the corresponding lined-up stop ring tooth 22, thus preventing any further rotation of shaft 19.

12. The driving clutch 123, 124, slips because the stop ring drum is positively stopped, and this slipping continues until the follower 77 reaches the clutch plate 111, whereupon the locking fingers 59a—59j are rotated into locking engagement.

13. The limit switch contacts 129, 130, are then opened to break the motor supply circuit.

14. The tuning cycle is complete and the shaft 19 is positioned as desired.

What is claimed is:

1. Apparatus of the character described for selectively setting a rotatable shaft which is required to undergo either a fractional revolution or more than one complete revolution before arriving at its selected setting, comprising a pair of separate rotatable members each carrying a plurality of stop elements, a fixed comb mounted adjacent said rotatable members and having a series of teeth one for each of said stop elements and adapted to be aligned therewith for effecting stopping of said shaft, the stop elements on at least one of said members being independently presettable, and the stop elements on both members being spaced apart so that for any given setting of said shaft a single stop element on one member is in planar alignment with a single stop element on the other member, means to rotate said members relatively to each other, and means to move said members longitudinally relatively to each other to bring any desired stop element on one member into planar alignment with a selected stop element on the other member and with a tooth on said comb and thereby to determine the extent of rotation of said shaft.

2. Apparatus of the character described for selectively setting a rotatable shaft which is required to undergo either a fractional revolution or more than one complete revolution before arriving at its selected setting, comprising a pair of separate rotatable members each carrying an equal number of stop elements with the stop elements on each member being differently spaced with respect to the stop elements on the other member so that for any desired setting of said shaft only a single stop element on one member is in planar alignment with a single stop element on the other member, and means to selectively shift the stop members longitudinally with respect to each other to determine which stop elements on the respective members are to be in planar alignment and thereby to determine the extent of rotation of said shaft.

3. Apparatus according to claim 2 in which one of said members is fastened to said shaft to be rotated as a unit therewith, and means are provided for driving both said members to respective homing positions and thereafter reversing the rotation of said members until the selected stop element on one member is brought into abutting relation with the corresponding selected stop element on the other member.

4. Apparatus of the character described for selectively setting a rotatable shaft which is required to undergo either a fractional revolution or more than one complete revolution before arriving at a selected setting, comprising a pair of rotatable members each carrying a series of stop elements unequally spaced longitudinally of the axis of rotation of the members and arranged to form a plurality of different stop combinations for said shaft, each stop combination being defined by an abutting engagement between a single stop element of one member and a single stop element of the other member, and means to rotate said members relatively to each other and to move them longitudinally with respect to each other until a selected stop element of one member is brought into abutting relation with a selected stop element on the other member.

5. Apparatus according to claim 4 in which one of said members is driven as a unit with said shaft, and means are provided for driving the other member at a reduced speed with respect to the first member.

6. Apparatus according to claim 4 in which the stop elements of at least one of said members are mounted thereon for independent presettable adjustment around the rotational axis thereof.

7. Apparatus according to claim 4 in which each of said members is in the form of a drum constituted of a series of single-tooth stop rings releasably clamped between spacer elements.

8. Apparatus according to claim 4 in which each of said members is in the form of a drum constituted of a series of stop rings each carrying one of said stop elements, the stop rings on at least one of said drums being unequally spaced along the length thereof and capable of independent presetting around the rotational axis thereof.

9. Apparatus of the character described, comprising a primary rotatable shaft to be selectively set, a secondary rotatable shaft driven in fixed but reduced speed relation with respect to the primary shaft, a plurality of unequally spaced stop elements carried by the primary shaft, a plurality of unequally spaced stop elements carried by the secondary shaft, the relative spacings of the stop elements on both shafts being predetermined so that for any desired selective setting of the primary shaft only a single stop element thereon is in planar alignment and abutting relation with a single stop element on the secondary shaft.

10. Apparatus according to claim 9 in which the stop elements on said secondary shaft are selectively slidable therealong.

11. Apparatus according to claim 9 in which the stop elements of said secondary shaft are slidable therealong, and an automatic switch of the circuit-seeking type is coupled to said slidable stop elements to selectively determine the extent of said sliding movement.

12. Apparatus according to claim 9 in which a set of fixed stop members are mounted in planar alignment with the stop elements on the said primary shaft to provide a fixed stop for the said abutting element of said shafts.

13. Apparatus according to claim 9 in which a set of fixed stop members are mounted in planar alignment with the stop elements on said primary shaft, a set of shiftable stop members are provided in planar alignment with the stop elements on the secondary shaft, and means are provided for shifting said shiftable stop members as a unit to lock the said abutting stop elements on the primary and secondary shafts against a corresponding one of said fixed stop members.

14. Apparatus according to claim 9 in which said stop elements on the secondary shaft are slidable bodily therealong, a fixed stopping comb is provided having its teeth in planar alignment with the stop elements of the primary shaft, and a shiftable stopping comb is provided with its teeth in planar alignment with the stop elements on the secondary shaft and slidable as a unit therewith, the said shiftable comb being normally out of the path of movement of the stop elements on both said shafts.

15. Apparatus of the character described, comprising a primary shaft to be selectively set, a secondary shaft, a plurality of single-tooth stop rings carried by the primary shaft, a corresponding plurality of single-toothed stop rings carried by the secondary shaft, a fixed comb having its teeth in planar alignment with the stopping rings on said primary shaft, and means to rotate the said shafts in predetermined speed relations and to shift the stop rings on both shafts longitudinally with relation to one another to bring into mutual abutting relation only a single stop ring tooth on each of said shafts and a single tooth on said comb to provide a positive selected stop against further rotation of said primary shaft.

16. Apparatus according to claim 15 in which a shiftable comb is provided having its teeth in planar alignment with the stop rings on the secondary shaft, and means are provided for shifting said shiftable comb to lock said abutting teeth on said primary and secondary shafts in mutual abutting relation with said single-tooth on said fixed comb.

17. Apparatus according to claim 15 in which primary and secondary shafts are rotated in opposite directions to effect said abutting relation of said teeth.

18. Apparatus according to claim 15 in which the stopping rings on said primary shaft are independently presettable therearound and means are provided for releasably clamping them in their preset position.

19. Apparatus according to claim 15 in which said stop rings are unequally spaced on their respective shafts by intervening spacers, and means are provided for releasably clamping the rings to the primary shaft for independent presetting adjustment therearound.

20. Apparatus of the character described, comprising a primary shaft to be selectively set, a secondary shaft, said shafts being parallel to each other, a primary stop ring drum carried by the primary shaft, a secondary stop ring drum carried by the secondary shaft, each drum having a series of single teeth spaced unequally apart along the drum length and spaced apart around the drum circumference, the said drums being rotatable with their respective shafts, means to permit the drum on the secondary shaft to move longitudinally thereof, a fixed comb having its teeth in planar alignment with the stop rings on said primary shaft but having for any desired setting of said primary shaft only a single tooth in planar alignment with a single tooth on said secondary drum, means to selectively slide said secondary drum to bring a desired tooth thereon into planar alignment with a tooth on said comb, means to rotate said secondary drum to bring the said desired tooth into stopping engagement with said single tooth on said comb, and means to rotate said primary drum in the opposite direction to the rotation of the secondary drum to bring a single tooth on said primary drum into stopping engagement with said single tooth on the secondary drum, and thereby to stop said primary shaft at its desired setting.

21. Apparatus according to claim 20 in which said comb is mounted with respect to said drum so that the stopping teeth of the primary drum cannot be stopped by the teeth of said comb until a stopping tooth of the secondary drum is rotated into abutting relation with a tooth an said comb.

22. Apparatus according to claim 20 in which another shiftable comb is provided having teeth in planar alignment with the stopping teeth on said secondary drum, but normally out of the path of rotation of the said teeth on both drums, and means are provided for automatically shifting said shiftable comb to lock the abutting teeth of the primary and secondary drums against a corresponding aligned tooth on said fixed comb.

23. Apparatus of the character described, comprising a primary rotatable shaft to be selectively set, a secondary rotatable shaft, a plurality of stop elements carried by the primary shaft and spaced along the length thereof, a plurality of stop elements carried by the secondary shaft and spaced along the length thereof, the relative spacings of the stop elements cn the respective shafts being predetermined so that for any desired selective setting of said primary shaft only a single stop element thereon is in planar alignment and abutting relation with a single stop element on the secondary shaft, the stop elements on one shaft being movable longitudinally with respect to the stop elements on the other shaft, and means for effecting the said longitudinal movement, the last-mentioned means comprising a rotatable cam, a cam follower for translating the rotary cam movement into rectilinear movement of said member and of said longitudinally movable stop elements.

24. Apparatus according to claim 23 and having a reversible motor geared to said shafts for rotating both said shafts first to a home position and then in a reverse direction to a final selective setting, electric circuit means for controlling said motor, and means responsive only when said shafts have reached home position for closing said motor control circuits to effect said longitudinal movement.

25. Apparatus according to claim 23 and having a reversible motor which is geared to both said shafts for rotating them first to a home position and then in a reverse direction to a final selective setting, a lead screw shaft and follower also connected to said motor and driven in timed relation with said shafts, said cam being in the form of a grooved sleeve freely rotatable on said lead screw shaft, and means controlled by said lead screw follower for rotating said cam only after said shafts reach said home position.

26. Apparatus of the character described comprising a primary shaft carrying a primary selector drum, a secondary shaft carrying a secondary selector drum, each drum being rotatable with its shaft, the secondary drum being in two sections slidably mounted on the secondary shaft, spring means normally urging said sections towards each other, a stop for limiting the movement of said sections towards each other, cam-controlled means for moving one section away from the other without disturbing the latter, and an automatic circuit-seeking switch operated in unison with said cam-controlled means for determining the extent of said sliding movement, each of said drums having a series of stop elements thereon in predetermined spaced relation so that for any desired setting of the apparatus only a single stop element on one drum is in planar alignment and stopping abutment with a single stop element on the other drum.

27. Apparatus according to claim 26 in which said primary drum comprises a series of single toothed stop rings and intervening spacer sleeves, all of which are releasably clamped to said primary shaft to permit independent presetting of any ring on the primary shaft without disturbing the setting of the remaining rings.

28. Apparatus according to claim 26 in which said cam-controlled means includes a rotatable cam sleeve having a double reverse cam groove, a cam follower riding in said groove, and motor means for rotating said sleeve in one direction to cause said follower to move rectilinearly in opposite directions and thereby to determine which one of said sections of said secondary drum is to be selectively moved.

29. Apparatus of the character described comprising a primary shaft carrying a primary selector drum having a plurality of shaft stopping teeth, a secondary shaft carrying a secondary selector drum also having a plurality of stopping teeth, a fixed comb member mounted parallel to the axes of said drums and having a plurality of fixed teeth with which said drum teeth are arranged to be aligned to effect stopping of said shaft, each of said drums being rotatable with its shaft and the secondary drum being slidable on the secondary shaft, a reversible motor for driving said drums, an automatic circuit-seeking switch having its movable element movable as a unit with the sliding movement of said secondary drum, a cam-controlled reciprocating member for effecting the said sliding movement, a lead screw and lead screw follower coupled to said motor through a slip-friction clutch, means to close a circuit through said switch in response to the initiation of a new desired setting of the apparatus to cause rotation of said drums to a home position, stop means for preventing further rotation of said drums when they reach said home position but permitting further movement of said lead screw and lead screw follower to cause movement of said reciprocating member and simultaneous movement of the movable member of said seeking switch, means responsive when said switch reaches a position corresponding to the said desired setting to reverse the motor direction and thereby reverse the rotation of said drums until they are positively stopped by abutting engagement between aligned teeth on each drum with a corresponding tooth on said fixed comb, and means also controlled by said lead screw follower after said drums have been positively stopped for locking them in their stopped position.

30. An automatic shaft setting apparatus comprising an automatic circuit-seeking switch having a plurality of fixed contacts each allotted to a setting for said shaft, said shaft also having a movable wiper for said contacts, a selector drum which is capable of being rotated through one or more complete turns, a turns-counting drum for said selector drum, each of said drums having a series of stop teeth spaced longitudinally and peripherally of the respective drums so that for any given setting of said shaft only a single tooth on one drum is in planar alignment with a single tooth on the other drum, said turns-counting drum being shiftable longitudinally with respect to said selector drum, a member extending parallel to the axes of both drums and having a series of spaced fixed stop teeth, electric circuit means controlled by said selector switch for determining the extent of said longitudinal movement, and additional electric circuit means effective after said turns-counting drum has been selectively moved longitudinally to cause both said drums to rotate to a final selected stopping position determined by the mutual abutting relation between said planarly aligned single teeth with an associated fixed stop toothed on said member.

31. Apparatus of the character described, comprising two rotatable shafts, means to operate one shaft through a plurality of rotations and including means to stop it at any predetermined point throughout its range of rotation, means to operate the other shaft through a range not exceeding a single rotation and including means to stop said other shaft at a predetermined selectable point in its range of rotation, a single motor for driving both said shafts, each of said shafts including a series of unequally spaced single toothed stop rings, the stop rings on one shaft being shiftable longitudinally thereof, and an automatic circuit-seeking switch for determining the extent of said longitudinal shifting movement.

32. Apparatus according to claim 30 in which limit means are provided for terminating the operation of the motor after both said shafts have reached a final selected common stopping position.

33. An automatic shaft-positioning apparatus, comprising a reversible driving motor, gears driven by said motor, a primary selector drum assembly, a slip-friction clutch between one of said gears and said primary drum assembly, a secondary selector drum assembly, the shaft which is to be positioned being connected to said primary drum assembly, gearing means for driving said drums so that the primary drum can undergo its maximum number of rotations during a single rotation of said secondary drum, each of said drums carrying a series of longitudinally spaced single-toothed stop rings, the number of complete rotations of said primary drum being determined by a particular stop ring on the primary drum which is in planar alignment with a particular stop ring on the secondary drum, an automatic circuit-seeking switch for determining when said rings are in alignment, means for arresting said motor after a predetermined time subsequent to said drums arriving at a final common selected stopping point, said secondary drum being longitudinally shiftable with respect to the primary drum, and an operating cam and cam follower for moving said switch member and said secondary drum in unison to a selected position.

RICHARD W. MAY.

REFERENCES CITED

The following references are of record in the file of this patent:

UNITED STATES PATENTS

| Number | Name | Date |
|---|---|---|
| 2,023,853 | Paschall | Dec. 10, 1935 |
| 2,396,714 | May | Mar. 19, 1946 |